Nov. 20, 1923.　　　1,474,395
C. B. WATSON
PETROLEUM REFINING APPARATUS
Filed April 2, 1920　　　4 Sheets-Sheet 3
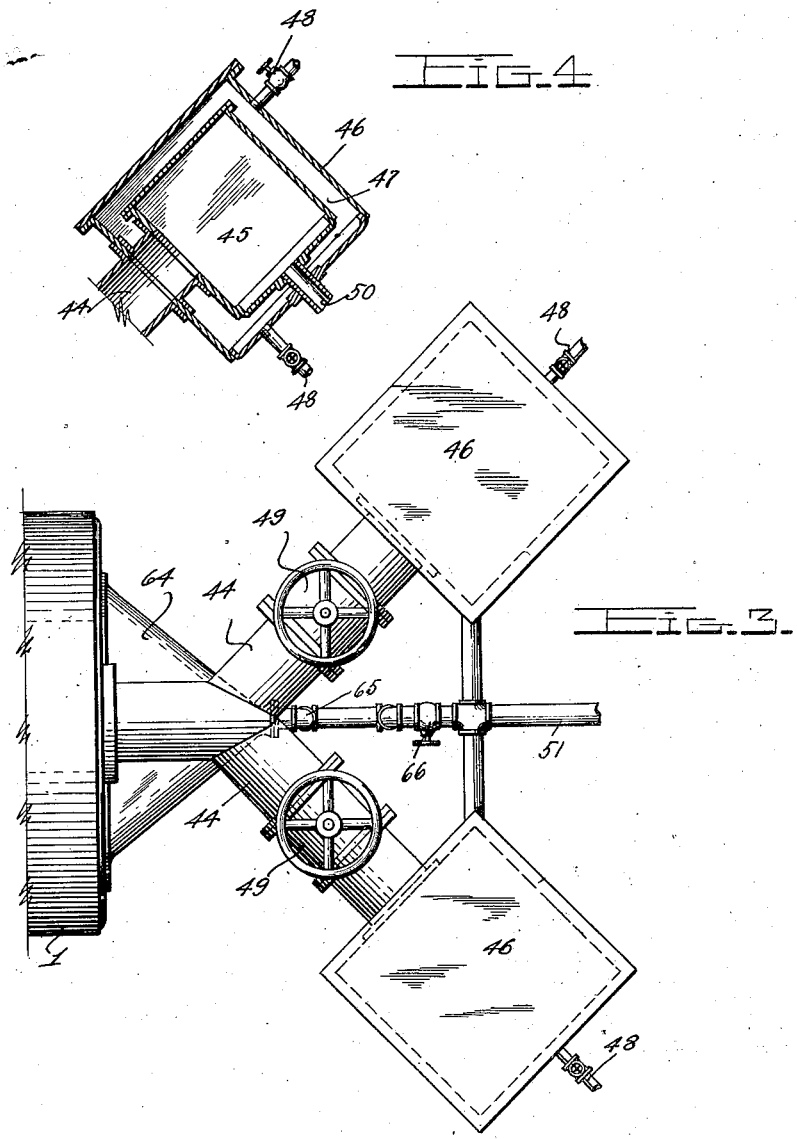
Inventor
Cornelius B. Watson

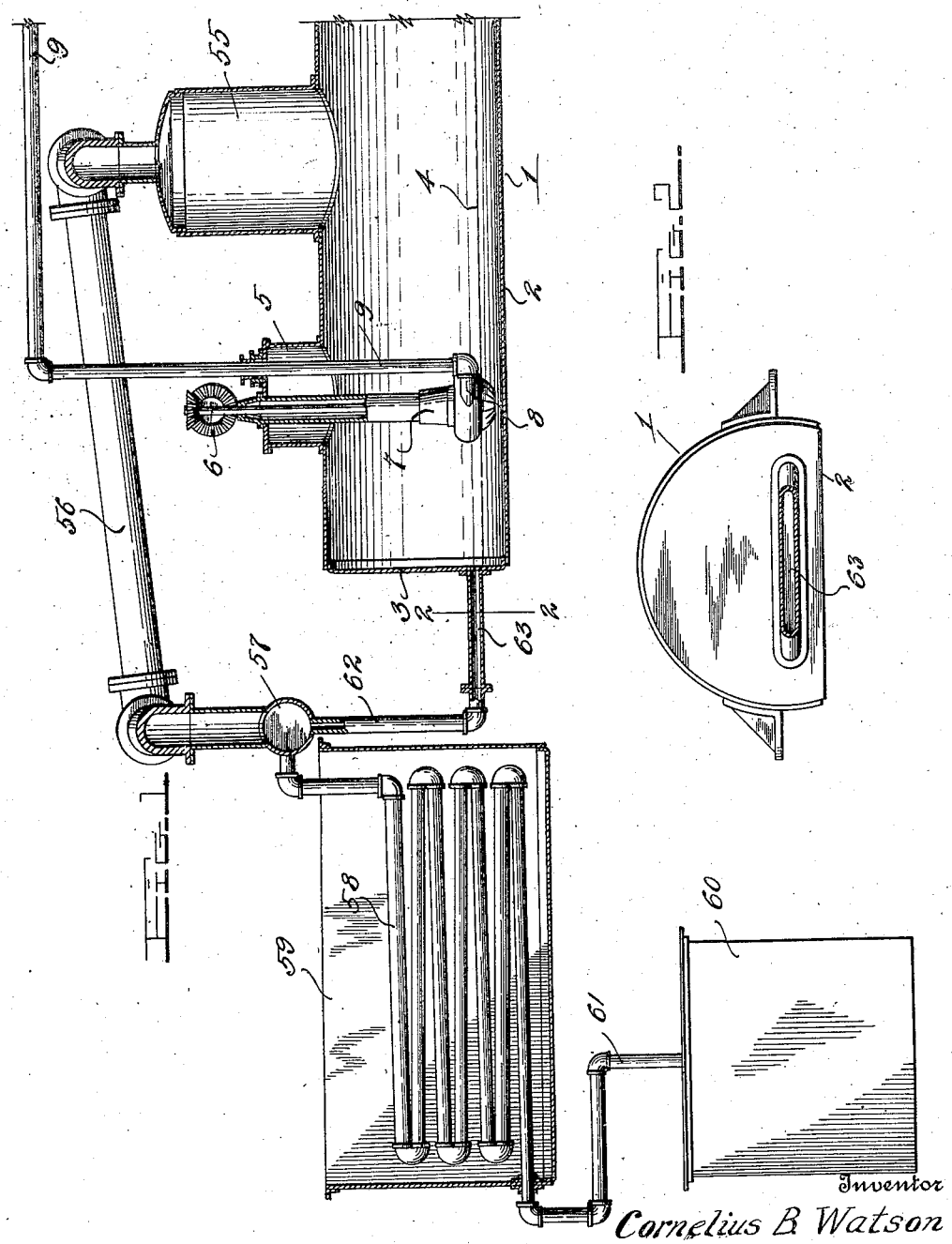

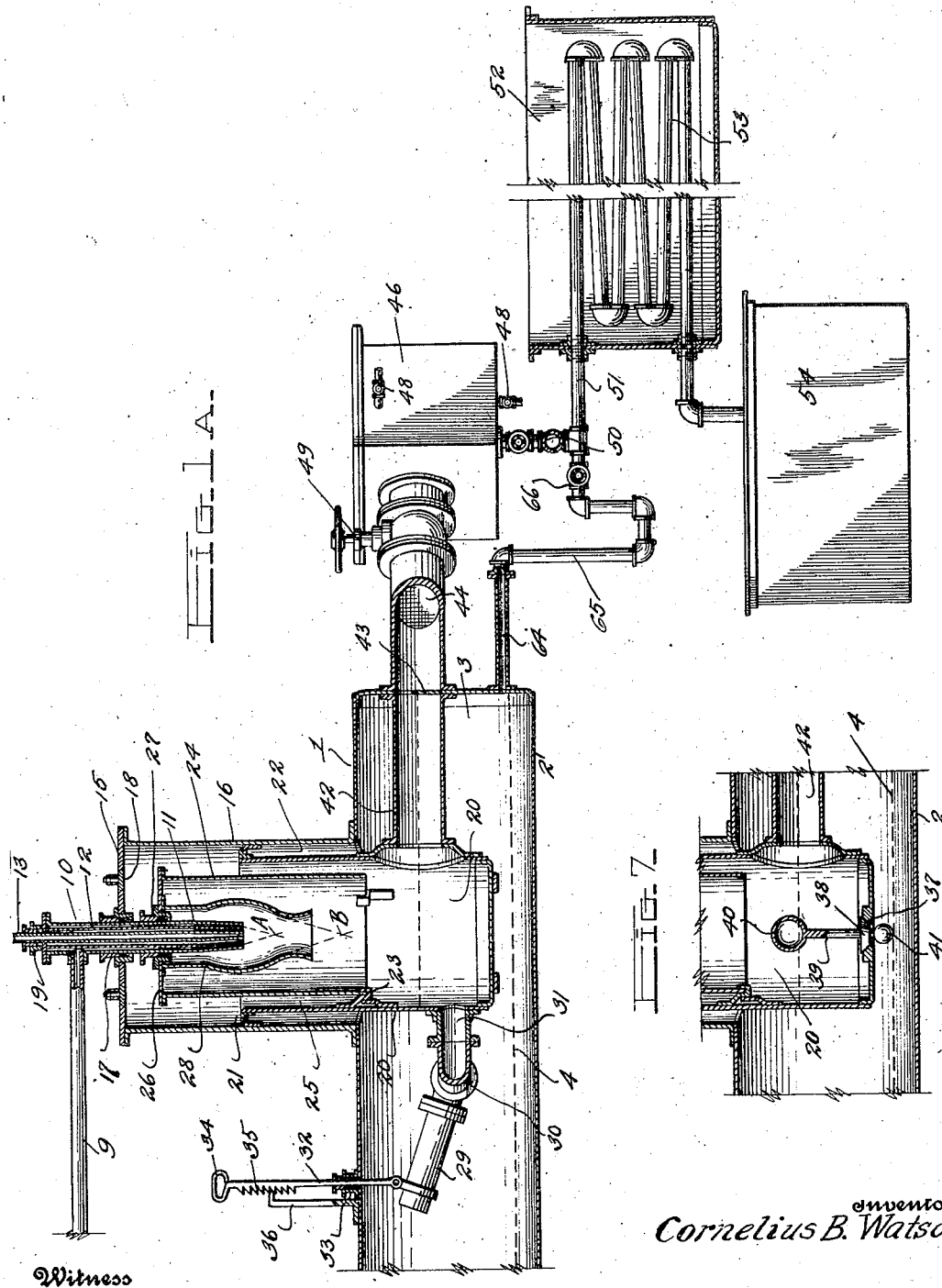

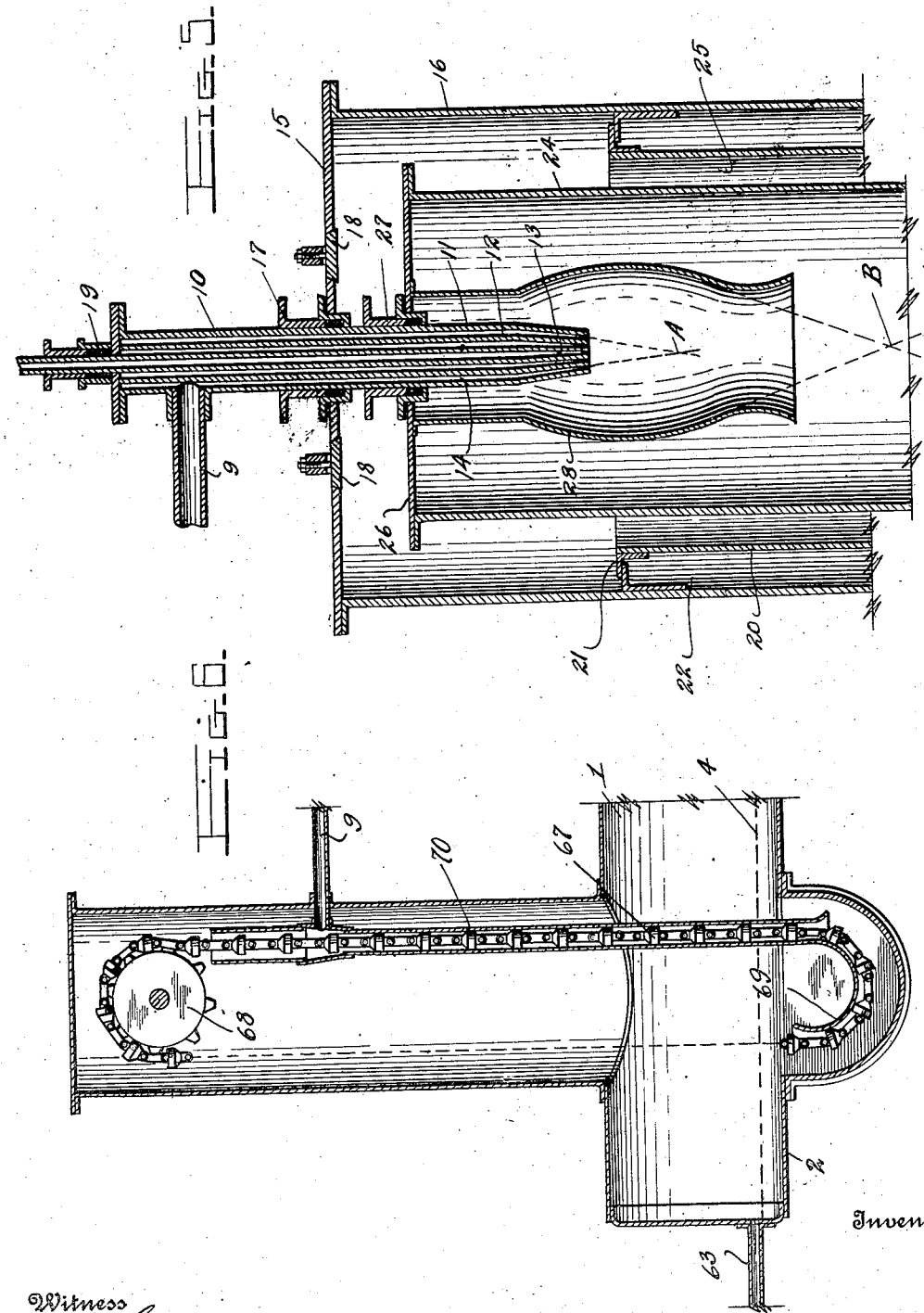

Patented Nov. 20, 1923.

1,474,395

UNITED STATES PATENT OFFICE.

CORNELIUS B. WATSON, OF COLUMBUS, OHIO.

PETROLEUM-REFINING APPARATUS.

Application filed April 2, 1920. Serial No. 370,665.

*To all whom it may concern:*

Be it known that CORNELIUS B. WATSON, a citizen of the United States, residing at Columbus, in the county of Franklin and State of Ohio, has invented certain new and useful Improvements in Petroleum-Refining Apparatus, of which the following is a specification.

This invention relates to an improved system and apparatus for cracking or breaking down the molecular structure of heavy petroleum, and has for its object to provide mechanism whereby the heavy wax distillate, which is a residue of an initial refining process, may be again subjected to the effects of intense heat so as to crack its molecular formation and to permit of the separation of the volatile portions thereof from the heavier portions.

Another object of the invention resides in an apparatus of this nature wherein means of a novel character are provided for applying necessary heat to the petroleum and for breaking down its formation without permitting the obnoxious carbon created thereby to collect or adhere upon adjacent metallic surfaces.

Another object of the invention resides in the provision of an apparatus of this character wherein is provided a structure for effecting the retention of a circulatory body of molten metal which, at a local point in its course of travel, is passed through a nozzle structure so that the same will be sprayed in the form of a hollow cone, and to provide means whereby the petroleum will be introduced into contact with the molten material forming the cone, thereby allowing for the cracking of the petroleum.

With these and other objects in view, as will appear as the description proceeds, the invention accordingly consists in the novel features of construction, combination of elements and arrangement of parts, hereinafter to be fully described and to have the scope thereof pointed out in the appended claims.

In the accompanying drawings, forming a part of this specification, and in which similar characters of reference denote like and corresponding parts:

Figure 1 is a vertical sectional view taken through the left half of the petroleum refining apparatus comprising the present invention.

Figure 1[a] is a similar view taken through the right half of the apparatus.

Figure 2 is a vertical sectional view taken along the line 2—2 of Figure 1.

Figure 3 is a top plan view of the secondary separation structure.

Figure 4 is a vertical sectional view through one of the secondary separation chambers.

Figure 5 is an enlarged sectional view taken through the nozzle structure.

Figure 6 is a vertical sectional view disclosing a slightly modified form of pump, and, Figure 7 is a detailed vertical sectional view of a slightly modified form of structure for maintaining the level of the molten metal in the receiving receptacle.

Inasmuch as the primary difficulty with cracking process heretofore has been the handling of the carbon formed, which takes place at the moment of cracking, and inasmuch as when the carbon is formed it attaches itself instantly to any apparatus with which the oil is in contact at the time, the present invention provides a structure wherein this difficulty has been eliminated. To this end, the present invention consists primarily of a longitudinally disposed still 1. This still is of metallic construction and is substantially semicircular in cross section, as is clearly disclosed in Figure 2. This construction results in the provision of a relatively flat base 2, the latter being adapted to be positioned over any suitable source of heat such, for example, as a furnace. The still is of hollow form and has its ends closed by means of walls 3 so as to thereby provide a receptacle capable of containing against loss a suitable quantity of a molten metal, for example lead or its equivalent, the level of the latter in the still being indicated by the numeral 4. It will be manifest that by heating the still, the mobility of the metal may be maintained.

In the preferred form of the invention, the still is provided in its upper side with a cap 5, through which the power driven shaft 6 of a centrifugal pump 7 extends. The base of this pump is located beneath the level 4, so that the operation of the pump will result in positive flow on the part of the metal. The discharge end 8 of the pump extends upwardly through the cap 5 and is terminated in a horizontally extending pipe 9 which extends in parallelism with the still 1 and at a position above the latter. The forward end of the pipe 9 terminates in communication with a nozzle structure 10 which extends into the still 1. This nozzle structure in its preferred embodiment consists of an outer tube 11, an intermediate tube 12 and a central tube 13, the annular space between the tubes 11 and 12 serving to define a conduit 14 through which the molten metal is forced. The nozzle structure itself is mounted upon the horizontal upper wall 15 of a housing 16 which, in turn, is mounted upon the upper side of the still 1, the outer tube 11 of the nozzle structure being disposed to extend through a gland 17 provided in the wall 15, the structure serving to prevent undue loss of vapors which may arise within the still. The wall 15 may also be provided with hand hole plates 18 by means of which interior parts are rendered accessible. The top of the outer tube 11 is also provided with a packing gland 19 through which the central tube 13 extends, said gland 19 serving in the manner of the gland 17 to prevent undue escape of confined vapors.

Located within the still 1 and the housing 16 is a receptacle 20. This receptacle is spaced from the wall of the housing 16, yet is carried by the latter by the provision of angular brackets 21, the latter being fixed respectively to the upper end of the receptacle 20 and to the inner wall of the housing 16, whereby when the same are in engagement a secured suspension of the receptacle 20 will be afforded and the arrangement is such that an annular space 22 will be provided between the walls of the housing and the receptacle. The receptacle 20 is also provided interiorly with fixed brackets 23 which are so positioned as to receive the lower annular edge of a reaction chamber or an inverted vapor dome 24. It will be observed that th dome 24 is of appreciably smaller diameter than the receptacle 20, yet, through the provision of the brackets 23, the secure support of the dome will be provided, the arrangement is such that an annular space 25 is provided between the walls of the dome and the inner walls of the receptacle 20, thus providing a space which is in communication with the upper end portion of the housing 16 and also with the annular space 22 between said housing and the receptacle.

The upper horizontal wall 26 of the dome is provided with a packing gland 27, which is so positioned as to receive the outer tube 11 of the nozzle structure, this packing 27 serves to prevent undue loss of vapors by reason of defective joints. By the provision of the plates 18, it will be manifest that adjustments of the gland 27 may be quickly effected from exterior positions. Also, depending from the wall 26 and lying within the dome 24 is a hollow open ended vessel 28, which is so positioned as to receive the discharge end of the nozzle structure. This vessel is of bulbular formation and is so positioned as to surround the discharge end of the nozzle structure.

From the foregoing description, it will be evident that a circulation of the molten metal will take place within the still, that is, the metal will be forced through the pipe line 9 and will be discharged into the conduit 14 of the nozzle structure. The lower end of the conduit 14 is terminated angularly with respect to the longitudinal axis of the nozzle structure, and this arrangement is such that the metal discharged from the nozzle structure will be in the form of a hollow cone or spray, the apex of which has been indicated by the letter A. Therefore, it will be seen that the oil forced through the central tube 13 will be discharged in this conical metal formation and thereby introduced into intimate contact with the cracking edge. At the first contact of the oil and the molten lead, a portion of the oil becomes cracked, the sudden vaporization causing the lead and remaining oil to strike violently against the side of the vessel 28, from which the lead is again forced into a stream forming a second hollow cone, the latter converging at B. The formation of the second cone is the result of the peculiar construction of the curved walls of the vessel 28 and it will be seen that any oil in the vessel 28 will again come into contact with the molten lead before leaving said vessel and will therefore be subjected to a second cracking operation. It will be manifest that the scouring action of the lead against the sides of the vessel 28 will be more than sufficient to remove any carbon adhering to such sides. Therefore by the peculiar construction of the nozzle structure and the cooperative vessel 28, an apparatus is provided whereby the cracking operation will take place in space and that the pressure resulting from the operation will effectively prevent the collection of carbon upon adjacent surfaces. The apparatus is therefore capable of being continuously used without involving cleaning operations, repairs and other such delays that are normally present in mechanisms of this character.

The cracked oil, molten lead and carbon falls thereafter into the receptacle 20, where a separation is made based on the differential in gravity between the lead, oil and carbon, the carbon and that portion of the oil which remains uncracked will be caused to float on the surface of the lead deposited within the receptacle. The level of the molten metal within the receptacle 20 and its discharge into the still 1 is controlled, if desired, by means of a swinging pipe 29, the latter being swiveled as at 30 to the discharge outlet 31 of the receptacle. The other end of the pipe 29 is connected with a rod 32 which extends upwardly through a packing gland 33 provided in the upper portion of the still 1. This rod is equipped at its extreme upper end with a handle portion 34, and with ratchet teeth 35, the latter being disposed so as to resiliently engage with a fixed bracket 36 carried by the still. Manifestly, by the adjustment of the rod 32, the height of the discharge end of the pipe 29 within the still 1 may be regulated. Therefore, it follows that the level of the molten lead within the receptacle 20 will likewise be regulated by the positions of operation occupied by the pipe 29.

A modification of this structure has been disclosed in Figure 7, and in this form of the invention, the base of the receptacle 20 is provided with an outlet port 37, the latter being controlled by means of a valve 38, which is equipped with a vertically disposed stem 39. The upper end of the latter carries a hollow iron ball 40 which serves in the capacity of a float, and a weight 41 is connected with the under portion of the valve 38 and normally serves to seat the latter in such manner as to cover the port 37. Obviously, when the level of the molten lead within the base of the receptacle 20 reaches a predetermined height, the valve 38 will be elevated, thus opening the port 37 and permitting of the return of the metal into the base of the still 1.

The base of the receptacle 20, in line with the level of the lead therein, is provided with a discharge conduit 42 which extends horizontally through one of the end walls 3 of the still. This conduit is provided at any suitable point in its length with a baffle wall 43, which serves to arrest further flow of the metal away from the receptacle 20. When sufficient oil has accumulated on the surface of the lead, the oil carrying the floating carbon will flow through the conduit 42 and thence through the valved diverging branches 44 thereof and into a pair of secondary separation chambers 45. These chambers are located within housings 46, whose walls are spaced from the walls of the chambers 45 to provide steam receiving spaces 47. By means of the spaces 47, the chambers 45 are heated by virtue of steam, or some other equivalent fluid, to prevent the condensation of such vapors which might pass into the chambers 45 with the oil and carbon. Steam inlet and outlet pipes 48 are connected with the housings 46 and communicate with the spaces 47 therein to effect the introduction and exit of steam introduced into said spaces. The branches 44 of the conduit 42 are, as shown, provided with valves 49 by means of which the entrance of the carbon and oil into the separation chambers is controlled. The bottoms of said chambers are provided with outlet pipes 50, which are suitably valved so as to control the passage of oil into a common cooling pipe 51. This pipe leads into a tank 52 and communicates with a coil 53 located in said tank. This coil is immersed in cold running water so that the oil located therein will be reduced in temperature below the flash point before being exposed to the atmosphere. A residue tank 54 is provided to receive the condensed oils discharged from the coils 53.

It will be seen that the vapors resulting from the cracking process or operation will arise in the housing 16 and will be directed in a circuitous path by way of the annular spaces 22 and 25, to the interior of the still 1. These vapors will collect in a dome 55 provided in the upper portion of the still, and will pass from said dome by way of the pipe 56. This pipe terminates in a header 57 in which some condensation of the vapors is allowed to take place. The lighter vapors, however, will pass from the header 57 into a coil structure 58 which is situated in a tank 59. Cold running water is adapted to be introduced into the latter tank so as to effect the condensation of the vapors discharged into the coil structure, and such condensed vapors will be lead from the coil structure and discharged into the finished product tank 60 by way of a pipe line 61. It will also be evident that the heavier ends of the vapors will have condensed by the time they reach the header 57 and that these heavy ends will pass from the header by way of a vertical pipe 62. The lower end of the pipe 62 communicates with a flat flaring conduit 63, the latter being substantially circular at its point of connection with the lower end of the pipe 62 and of flat elongated form at its point of connection with the end wall of the still. This construction of the conduit 63 allows the condensed oil to spread in a thin film over the surface of the molten lead contained in the bottom of the still. Therefore, part of this heavy condensate is re-cracked and the remainder flows across the surface of the lead and carries with it any carbon which may have worked its way into the main body of the still. This oil and collected carbon is discharged from the still by way of the conduit 64, which is of substantially the same construction as the conduit 63, the discharge end of the conduit 64 being connected by means of a suitable pipe line 65 with the pipe 51 leading into the coil structure 53, in order that the heavier particles of the oil will be discharged in the residue tank 54. A valve 66 is situated in the pipe line 65 to govern the passage of the oil therethrough. As shown in Figure 6, a slightly modified form of pump structure may be provided in lieu of the centrifugal type of pump indicated by the numeral 7. In the modified form, the pump structure consists of a plurality of chains and disks 67 which are articulately connected in endless form. The structure 67 is driven by means of a sprocket 68 to which power is applied in any suitable manner. The lower run of the structure 67 passes around a circular guide 69, which latter is continued upwardly in the form of a pipe 70, the latter having its lower end open so as to lie beneath the level of the molten metal, and the upper end of said pipe communicates with the pipe line 9, or in other words, with the nozzle structure. Manifestly, the movement of the structure 67 will result in the forced elevation of the molten lead, thereby causing the latter to be elevated from its normal position within the bottom of the still and forced through the nozzle structure. Either one form or the other of pump may be employed in connection with the apparatus described, or both may be used if necessary.

From the foregoing description, taken in conjunction with the accompanying drawings, it will be manifest that the circulation of lead in the apparatus allows the lead and the oil to be cracked to be brought together in space, thereby relieving the apparatus of the chief trouble found in many other cracking devices, namely, the adhering of carbon effected by the cracking process to any iron or steel present; also by means of this circulation of lead, currents are set up therein and thereby greater thermal efficiency is obtained. After the oil is once cracked, the carbon which has formed while the oil and lead are dropping will then be caused to float on the surface of the lead. The carbon will therefore not attach itself to any portion of the apparatus where damage can be done. As has been previously stated, the vessel 28 is of such construction as to permit its internal wall to be thoroughly scoured by the expansion resulting from vaporization. This feature prevents obnoxious carbon deposit and merely prolongs the life of the apparatus. The present structure eliminates the necessity of using such devices wherein the oil is either cracked while it is passing through tubes, and thus deposits its carbon on the tubes, or wherein the oil is admitted to the cracking edge through tubes, which latter construction usually results in the accumulation of carbon at the top of the tubes through which the oil is admitted. Again attention is also directed to the fact that in the present invention the apparatus undertakes to break down the molecular composition of petroleum at particular atmospheric pressure.

What is claimed is:

1. In an apparatus of the class described, a heated still containing a suitable body of molten metal, a nozzle structure, means for effecting a forced circulation of said metal through said nozzle structure, cooperative means for introducing petroleum into intimate contact with the metal discharged from the nozzle structure when the metal is passing through space, means for leading the resultant vapors caused by the engagement of the petroleum with the metal from said apparatus, said latter means comprising a conduit, a coil structure situated in a cooled tank communicating with the discharge end of said conduit, a return connection for heavy condensate leading from the discharge end of said conduit back into said still, said return connection being formed to provide a flaring conduit, one end thereof being of substantially circular and reduced formation, and the opposite end of wide flaring formation conforming to the width of the still.

2. In an apparatus of the class described, a heated still capable of containing a body of molten metal, a pipe line leading from said still, means for forcing said metal through said pipe line, means for introducing petroleum into intimate contact with the metal discharged from said pipe line and while said metal is passing through space, whereby the cracking of said petroleum will be effected, means for leading the vapors created by the cracking process from said still, a receptacle capable of receiving metal discharged from said pipe line and the heavier (non-volatile) particles of the petroleum, means for discharging said heavier products of the petroleum from said receptacle, and mechanism operable to control the level of the metal located within said receptacle.

3. In an apparatus of the class described, a heated still capable of containing a body of molten metal, a nozzle structure, a pump for forcing said metal through said nozzle structure, feed mechanism for introducing petroleum into intimate contact with the metal discharged from said nozzle structure, whereby the cracking of said petroleum will be effected, means for leading the vapors resulting from the cracking process from said apparatus, a receptacle positioned to receive the non-volatile products of said petroleum and the metal discharged from the nozzle structure, means for regulating the height of the molten metal within said receptacle, a discharge conduit for removing petroleum from said receptacle, means disposed within said conduit to arrest the inflow of molten metal therein, a steam heated container into which said conduit discharges, and a coil structure in communication with the bottom of said container.

4. In an apparatus of the class described, a heated still capable of containing a body of molten metal, a nozzle structure, a pump capable of circulating said metal through said nozzle structure, means for introducing petroleum into intimate contact with the metal discharged from said nozzle structure, whereby the cracking of said petroleum will be effected, means for collecting and removing the vapors resulting from said cracking process comprising a conduit leading from said still, a header into which said conduit discharges, a coil structure capable of receiving the vapors from said header, a return connection leading from said header to the base of said still and by means of which the condensate within said conduit may be returned to said still without entering said coil structure, a receptacle into which the non-volatile portions of said petroleum is received, a second coil structure capable of receiving petroleum from said receptacle, and a second connection leading from said still to said second coil structure and serving to direct into said coil structure the condensate returned from said header.

5. In a petroleum still, a horizontally extending elongated drum having a flat bottom, arranged to receive a body of substantially molten metal, a dome arising from said drum, a nozzle structure positioned in said dome, means for circulating said metal from the bottom of said drum through said nozzle structure, means for passing petroleum centrally through said nozzle structure and into physical engagement with said metal as the latter issues from the discharge end of said nozzle structure, a supplemental reservoir arranged within said drum and located beneath said nozzle structure for the reception of said metal, and means for maintaining the level of the metal within said reservoir at a predetermined height.

6. In a petroleum cracking apparatus, a still arranged horizontally for the reception of a body of molten metal, a dome arising from the top of said still, a nozzle structure located within said dome, means for effecting a forced circulation of said metal from the bottom of said still through said nozzle structure, a conduit for introducing petroleum into said still passing centrally through said nozzle structure and terminating coincident with the discharge end of the latter, said conduit being subject to the heat of the molten metal passing through said nozzle structure and terminated to finally bring the petroleum into intimate physical contact with the metal discharged from said nozzle structure, means for separately discharging the light volatile hydrocarbon products from said still, and a separate discharge for the heavier products, comprising a supplemental reservoir situated to receive the metal discharged from the nozzle structure, means for determining the level of the molten metal within said reservoir, and a condensing apparatus in communication with said supplemental reservoir.

In testimony whereof I affix my signature.

CORNELIUS B. WATSON.